Figure 1:
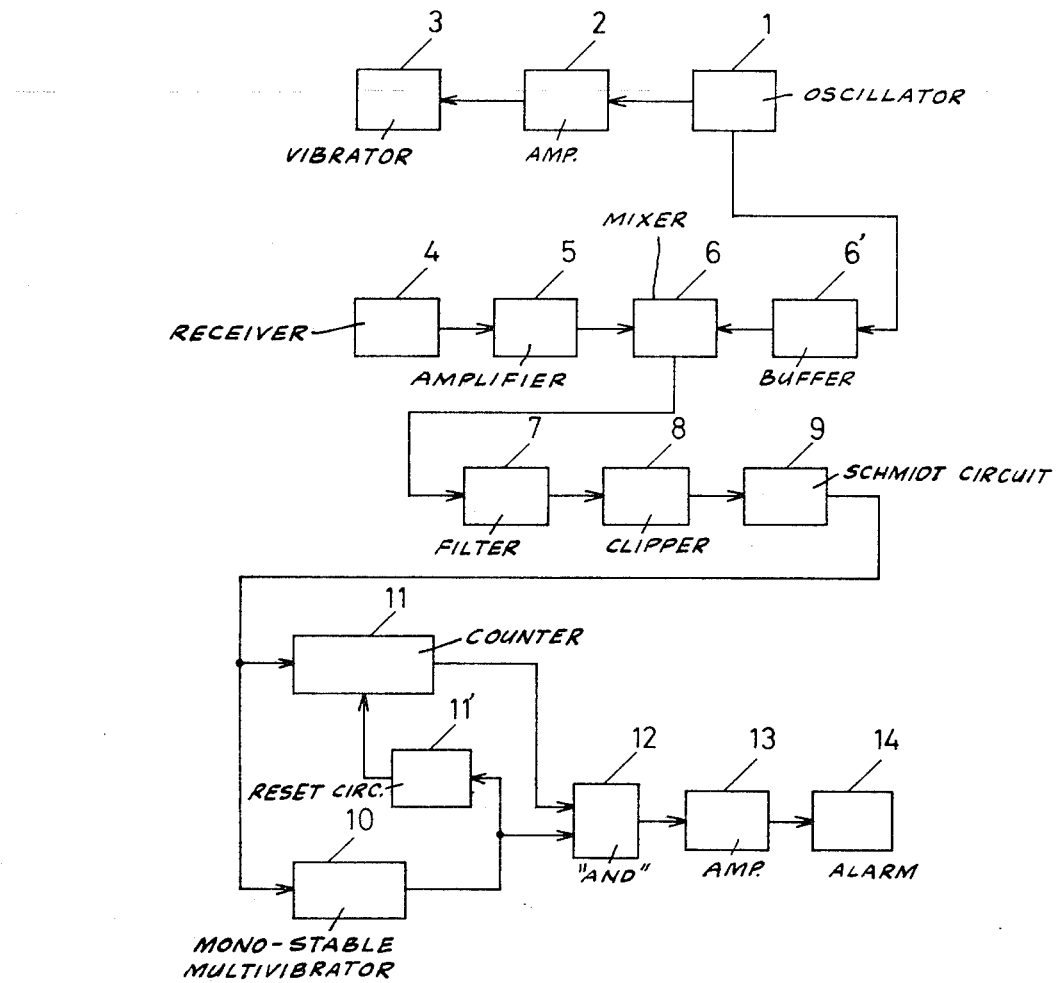

United States Patent
Sugiura

[15] 3,706,961
[45] Dec. 19, 1972

[54] AUTOMATIC ALARM SYSTEM

[72] Inventor: Kaku Sugiura, Machida-shi, Tokyo, Japan

[73] Assignee: Nippon Electronics Co., Ltd., Tokyo, Japan

[22] Filed: March 10, 1970

[21] Appl. No.: 18,216

[30] Foreign Application Priority Data

May 2, 1969 Japan ............................... 44/33558
July 9, 1969 Japan ............................... 44/53741

[52] U.S. Cl. ............... 340/1 R, 340/3 D, 340/258 A, 343/5 P
[51] Int. Cl. ............................................. G08b 13/16
[58] Field of Search ...... 340/1, 3, 3 D, 15, 16, 258 A; 343/5 PD, 7.7

[56] References Cited

UNITED STATES PATENTS

| | | | |
|---|---|---|---|
| 3,383,678 | 5/1968 | Palmer | 343/5 |
| 3,261,009 | 7/1966 | Stetten | 340/1 C |
| 3,271,730 | 9/1966 | Stedtnitz | 340/3 |
| 3,036,293 | 5/1962 | Vester, Jr. | 343/13 X |
| 3,441,905 | 4/1969 | Auer, Jr. et al. | 340/3 D |
| 3,525,978 | 8/1970 | Heinecke et al. | 340/16 |

Primary Examiner—Richard A. Farley
Attorney—Harry C. Bierman, Jordan B. Bierman and Bierman & Bierman

[57] ABSTRACT

An automatic alarm system for detecting trespasser and the occurrence of fire is provided which is arranged to direct an ultrasonic wave into the space to be covered and to receive the wave reflected from a moving object to be detected. By Doppler effect, the received wave is shifted in frequency from the frequency of the emitted wave, and hence both waves are fed to a mixer to produce an electrical signal indicative of the frequency shift. This signal is clipped at an adjustable level, and part of the clipped waveform above that level is shaped into a pulse. Successive pulses are supplied to an accumulator means which produces an output to operate an alarm unit only when a number of pulses in excess of a given value occurs within a predetermined time period.

2 Claims, 2 Drawing Figures

AUTOMATIC ALARM SYSTEM

The invention relates to an alarm system, and more particularly to such system which utilizes the Doppler effect of an ultrasonic wave for automatically producing an alarm in response to the presence of trespass and the occurrence of fire or the like.

Fire alarms and intrusion alarms are known in a variety of configurations and designs, but there has not been developed an automatic alarm system capable of responding to both trespass and fire. While it is possible to detect both of these occurrences by directing an ultrasonic wave towards a moving object such as trespassing persons, flame or smoke and receiving the reflected wave to sense the shift in frequency that is caused by the Doppler effect of the moving object, and alarm unit sensitive to the Doppler effect is susceptible to malfunction because of thermal disturbances and other unidentified factors within an without the unit which give rise to noise interference.

Therefore, it is a purpose of the invention to provide an automatic alarm system which is operable to detect the Doppler effect caused to the frequency of an ultrasonic wave, but which is insensitive to disturbance factors and provides a reliable operation in response to the presence of a moving object to be detected.

According to the invention, there is provided an automatic alarm system which comprises means for emitting an ultrasonic wave of a given frequency, means for receiving the ultrasonic wave reflected from a moving object to be detected and producing an electrical signal indicative to a shift in the frequency of the received wave from the frequency of the emitted wave, said shift being produced by the Doppler effect of the moving object upon the emitted wave, clipper means for taking out part of the signal above a given amplitude in the form of a pulse, accumulator means for accumulating the pulse and operable to produce an output when the number of pulses generated within a predetermined time period exceeds a given level, and an alarm unit responsive to the output of the accumulator means.

Figure 2:
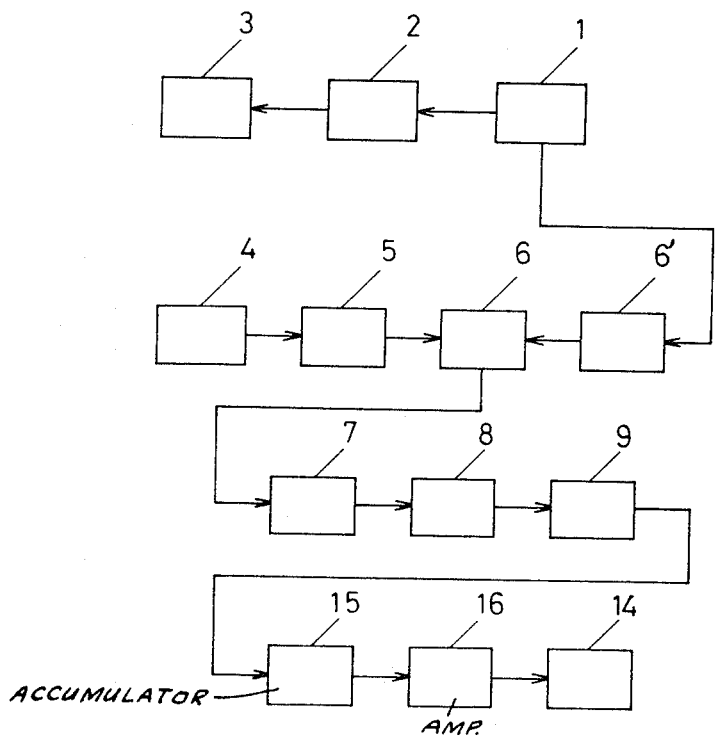

For better understanding of the invention, it will be described more fully with reference to the drawings in which FIG. 1 is a schematic block diagram of an embodiment of the invention, and FIG. 2 is a schematic block diagram of another embodiment of the invention.

Referring to FIG. 1, the automatic alarm system includes an oscillator 1 which generates an electrical signal of a radio frequency, for example, 19 KHz. The signal is amplified by a power amplifier 2, and the amplified output energizes an ultrasonic vibrator 3. Thus the vibrator 3 emits an ultrasonic wave of 19 KHz into the space which it is intended to be monitored by the system. The ultrasonic wave will be reflected by any surrounding obstracle which exists in the space, and will be received by a receiver 4. The received ultrasonic wave is converted into an electrical signal and amplified by a radio frequency amplifier 5 before being supplied to one input of a mixer 6. The mixer 6 has another input which is supplied with the electrical signal from the radio frequency oscillator 1 through a buffer circuit 6'.

When there is a moving object to be detected such as an intruder, flame or smoke, the ultrasonic wave as reflected by such object will have its frequency shifted by the Doppler effect of the moving object, and the mixer 6 operates to derive an electrical signal which is indicative of the difference of frequency between the emitted and received ultrasonic waves. The output signal of the mixer 6 is fed to a band-pass filter 7. When the oscillator generates a signal of 19 KHz, the center frequency of the band-pass filter 7 may be chosen to be about 33 Hz. The output of the filter 7 is connected with a clipper circuit 8 which functions to clip the output signal of the filter 7 at a given voltage level or amplitude and to pass only the portion of the signal waveform which is above such level to a Schmidt circuit 9 which follows the filter 7. The Schmidt circuit operates in the known manner to shape the portion of the waveform into a pulse. This pulse is fed to a mono-stable multivibrator 10, which is triggered into its unstable state by the pulse and returns to its stable state after a predetermined time delay, which may be chosen to be 0.5 second for example. The pulse from the Schmidt circuit 9 is also supplied to a counter 11 which may comprise a plurality of flip-flop stages. For example, the counter 11 may be a binary counter comprising three stages of flip-flops, thereby counting up to eight pulses from the Schmidt circuit 9 and then producing an output. Both output signals from the mono-stable multivibrator 10 and the counter 11 are applied to two inputs and an AND circuit 12. It will be seen that the AND circuit 12 produces and output only when it receives inputs at its both inputs. In other words, it produces an output pulse when the counter 11 has received a given number of pulses (eight in the present example) from the Schmidt circuit, as determined by the present value or full count of the counter 11, within a time period determined by the time delay (0.5 second) of the mono-stable multivibrator 10. The output pulse from the AND circuit 12 is amplified by a d.c. amplifier 13, the output of which operates a suitable alarm unit 14 such as an warning lamp or bell, thereby providing the automatic detection of the presence of a moving object. The sensitivity of the system can be adjusted depending on the intended monitoring function, by the provision of means for varying the level at which the clipper circuit 8 operates.

When there is no moving object that is to be monitored by the present system, the mixer 6 produces no output, and hence the Schmidt circuit 9 does not supply any output pulse. As a result, the system remains inoperative. Thermal disturbances and other factors may lead to an accidental generation of interference noises. However, it is found that such noises causes at most one pulse or two to be produced by the Schmidt circuit 9 within a short period such as 0.5 second, and it is very unlikely that these disturbance factors result in the production of a comparable number of pulses from the Schmidt circuit 9 to those produced by reflection of the ultrasonic wave from an actual moving object. Therefore, it will be appreciated that a proper choice can be made for the time delay of the mono-stable multivibrator 10 and for the maximum count of the counter 11 so that the alarm unit 14 cannot erroneously be operated by interference noises.

In the absence of a moving object to be detected, the counter 11 may contain a certain count less than its full count, and therefore an arrangement is made to reset the counter 11 after the predetermined time period. This is accomplished by supplying the output pulse of the mono-stable multivibrator 10 through a suitable reset circuit 11' to the reset terminal of the counter 11. Specifically, the multivibrator 11 is designed to produce a positive going rectangular pulse, when triggered by the pulse from the Schmidt trigger, all during the time it remains in its unstable state, and then the falling end of the rectangular pulse is used to reset the counter 11. Thus the AND circuit 12 produces an output to operates the alarm unit 14 when the counter 11 is set to its full count after the monostable multivibrator 10 has been triggered. The alarm unit 14 may be associated with means for manually interrupting the operation of the alarm unit 14 and for resetting the counter 11.

In the embodiment shown in FIG. 2, the circuit elements which receive pulses from the Schmidt circuit 9 and operate the alarm unit 14 are different from FIG. 1 arrangement. Specifically the output of the Schmidt circuit is connected to an accumulator circuit 15 which comprises a capacitor and a variable resistor (not shown) connected thereacross. The successive pulses from the Schmidt circuit 9 charge the capacitor, but the charge on the capacitor is discharged within a relatively short period through the parallel capacitor and does not remain for a prolonged period. When there is a moving object to be detected, there are produced a rapid successiion of pulses from the Schmidt circuit 9 to charge the capacitor in a cumulative manner, that is, electric charge supplied by one pulse, though partly lost by discharge, is added with the charge of the following successive pulses, whereby the capacitor within the accumulator 15 is rapidly charged within a relatively short period. When the voltage across the capacitor reaches a predetermined value, it operates an amplifier 16 which follows the accumulator circuit 15, and the amplifier 16 actuates the alarm unit 14.

The values of the capacitor and the variable resistor in the accumulator circuit 15 may be chosen such that with the oscillator 1 having the oscillation frequency of 19 KHz and the band-pass filter 17 having a center frequency of 33 Hz, for example, the amplifier 16 is actuated when either or more pulses have been applied to the capacitor within a time interval of 0.5 second. The setting of the accumulator can be varied by adjusting the value of the variable resistor.

When there is no moving object to be detected, the Schmidt circuit 9 does not produce a pulse, and hence the voltage across the capacitor in the accumulator cannot rise, so that the alarm unit 14 remains inoperative.

If interference noises are produced by thermal disturbances and other factors within and without the system, any resulting pulse produced from the Schmidt circuit 9 is only sporadic and it is normally unlikely that a rapid succession of pulses are produced within a short period, such as producing eight or more pulses in 0.5 second. Such sporadic pulses cannot charge the capacitor sufficiently to operate the alarm unit 14, because the charged supplied by them to the capacitor discharge before building up to any significant value.

Having described the invention, what is claimed is:

1. An automatic alarm system comprising means for emitting an ultrasonic wave of a given frequency, means for receiving said ultrasonic wave reflected from a moving object to be detected and producing an electrical signal indicative of a shift in the frequency of the received wave from the frequency of the emitted wave, said shift being produced by the Doppler effect of the moving object upon the emitted wave, clipper means for taking out the upper part of the signal above a given amplitude in the form of a pulse, accumulator means for accumulating said pulse, said accumulator means being operable to produce an output only when at least a preselected number of pulses have been received by said accumulator means within a predetermined time period, an alarm unit responsive to the output of said accumulator means, and a monostable multivibrator connected to receive the pulse from the clipper means, said multivibrator producing an output after a predetermined time delay, a counter connected to receive and count said pulses, said counter producing an output when at least a selected number of pulses have been received, and means responsive only to the concurrent presence of the outputs of both the monostable multivibrator and the counter to operate said alarm unit.

2. The automatic alarm system specified in claim 1, further including reset means responsive to the output of the monostable multivibrator to reset the counter.

* * * * *